(12) United States Patent
Dockter et al.

(10) Patent No.: US 6,591,276 B1
(45) Date of Patent: Jul. 8, 2003

(54) METHOD AND SYSTEM FOR MANAGING OBJECT TYPES FOR OBJECTS DEFINED EXTERNALLY TO THE SYSTEM

(75) Inventors: Michael J. Dockter, Wellington, FL (US); Randal J. Richardt, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 09/620,924

(22) Filed: Jul. 21, 2000

(51) Int. Cl.$^7$ .............................................. G06F 17/30
(52) U.S. Cl. ...................... 707/103; 707/101
(58) Field of Search ............................. 707/101, 103 R, 707/1, 2, 3, 4, 5, 6, 7, 8, 102, 104.1, 103 Y, 103 Z; 345/764, 733

(56) References Cited

U.S. PATENT DOCUMENTS

| | | | |
|---|---|---|---|
| 5,313,633 A | 5/1994 | Tomita et al. ................. | 707/1 |
| 5,732,257 A | 3/1998 | Atkinson et al. ........... | 707/102 |
| 5,732,263 A | 3/1998 | Havens et al. .............. | 707/100 |
| 5,819,086 A * | 10/1998 | Kroenke ...................... | 345/764 |
| 5,829,006 A | 10/1998 | Parvathaneny et al. ..... | 707/100 |
| 5,995,973 A | 11/1999 | Daudenarde .................. | 707/1 |
| 6,003,040 A | 12/1999 | Mital et al. .................. | 345/764 |
| 6,047,284 A | 4/2000 | Owens et al. ................ | 707/102 |
| 6,085,198 A * | 7/2000 | Skinner et al. ............. | 707/101 |
| 6,134,559 A * | 10/2000 | Brumme et al. ......... | 707/103 R |
| 6,301,584 B1 * | 10/2001 | Ranger ....................... | 345/733 |

FOREIGN PATENT DOCUMENTS

JP 1063560 3/1998

* cited by examiner

Primary Examiner—Diane D. Mizrahi
Assistant Examiner—Yicun Wu
(74) Attorney, Agent, or Firm—Sawyer Law Group LLP (57) ABSTRACT

A method and system for managing object types for objects which are defined externally to a system is disclosed. In a first aspect, the method and system comprises recording a relationship of an object to an object class within the system and then recording a system-defined super-class of the object class. A plurality of tables are utilized to record the relationship and the system defined super-class. In a second aspect, a method and system for receiving an externally generated object comprises determining that the externally generated object is represented as an object class in one of a base table and a derived table. The method and system further including obtaining a system-defined super-class of the object. The method and system further includes inserting an object class of the object into the derived table with an identifier of the system-defined super-class and a derived table identifier to create a relationship of a system-defined super-class to a user-defined subclass. The method and system further includes inserting an object and its unique identifier into an objects table, thus creating an accepted object. In a third aspect, a method and system for sending an externally generated object by a system comprises receiving a request, for the object. The request includes a tag. The method and system also includes obtaining information based upon the tag from an object table to provide the object in an appropriate format.

6 Claims, 10 Drawing Sheets

| Base_type | Class_name | |
|---|---|---|
| 1 | IkfObject | |
| 2 | IkfLink | |
| 3 | IkfTextDocument | |

| Base_type | Derived_type | Class_name |
|---|---|---|
| 2 | 100 | Critiques |
| 2 | 101 | Read |
| 2 | 102 | Authored |
| 3 | 103 | URL |
| 3 | 104 | Book |
| 3 | 105 | Biography |

| Base_type | Derived_type | Tag | Text |
|---|---|---|---|
| 3 | 105 | _1XX01 | Dora Jar |
| 3 | 105 | _1XX02 | Noah Goodbook |
| 3 | 105 | _1XX03 | Hartza Throbin |
| 3 | 103 | _1XX04 | http://www.xyz.com |
| 3 | 104 | _1XX05 | ISBN:1-12345-123-1 (*Isle of View*) |
| 2 | 100 | _1XX06 | "Critique of Isle of View" |
| 2 | 101 | _1XX07 | "I read the critique of Isle of View" |
| 2 | 101 | _1XX08 | "I read Isle of View" |
| 2 | 101 | _1XX09 | "Read to critique" |
| 2 | 102 | _1XX10 | "My critique of Isle of View" |
| 2 | 102 | _1XX11 | "My third book" |

| Base_type | Derived_type | Tag | From_Tag | To_Tag |
|---|---|---|---|---|
| 2 | 100 | _1XX06 | _1XX04 | _1XX05 |
| 2 | 101 | _1XX07 | _1XX01 | _1XX04 |
| 2 | 101 | _1XX08 | _1XX01 | _1XX05 |
| 2 | 101 | _1XX09 | _1XX02 | _1XX05 |
| 2 | 102 | _1XX10 | _1XX02 | _1XX04 |
| 2 | 102 | _1XX11 | _1XX03 | _1XX05 |

METHOD AND SYSTEM FOR MANAGING OBJECT TYPES FOR OBJECTS DEFINED EXTERNALLY TO THE SYSTEM

FIELD OF THE INVENTION

The present invention relates generally to data object types in a processing system and more particularly to managing object types for data objects defined externally to the system.

BACKGROUND OF THE INVENTION

In an object-oriented system, objects belong to object-classes that describe the data and the behavior common to all objects within the object-class. When an object is "checked-in" to a system and later "checked-out" of the system, the object-class is expected to be the same.

There are two conventional systems for receiving an object externally to the system and returning the object. Firstly, utilizing an object-oriented database; and secondly, creating a different table for each user-defined object-class in a Relational database.

Utilizing an object-oriented database is one way of introducing and retrieving objects. There are some problems with using object-oriented databases. First, object-oriented databases do not have the industry presence that Relational databases do. Second, object-oriented databases are not tuned for graph engine work. Oftentimes an object-oriented database is a complex solution for a simple problem.

Although creating a different table for each user-defined object-class can be performed, it has some disadvantages. First, backup and recovery management becomes more difficult. Second, database enforced referential integrity is sometimes not possible. Example: if an object is dependent upon a second object that is in one of a multitude of user-defined objects-classes, referential integrity does not allow a child table to be dependent on one of many potential parent tables. Finally, there is a greater variation between systems. Each installation of the system "grows" differently. Different objects are introduced to each system, thus different tables are created in each system. The same objects may be introduced in a different order in each system, thus tables containing the same information would be identified differently.

Accordingly, what is needed is a system and method for managing object types that are defined externally to the system that overcome the above-identified problems. The present invention addresses such a need.

SUMMARY OF THE INVENTION

A method and system for managing object types for objects which are defined externally to a system is disclosed. In a first aspect, the method and system comprises recording a relationship of a system-defined super-class to a user-defined subclass and then recording a relationship of an object to the user-defined subclass. A plurality of tables are utilized to record the relationship and the system defined super-class.

In a second aspect, a method and system for receiving an externally generated object comprises determining that the externally generated object is represented as an object class in one of a base table and a derived table. The method and system further includes obtaining a system-defined super-class of the object. The method and system further includes inserting an object class of the object into the derived table with an identifier of the system-defined super-class and a derived table identifier to create a relationship of a system-defined super-class to a user-defined subclass. The method and system further includes inserting an object and its unique identifier into an objects table, thus creating an accepted object.

In a third aspect, a method and system for sending an externally generated object by a system comprises receiving a request, for the object. The request includes a tag. The method and system also includes obtaining information based upon the tag from an object table to provide the object in an appropriate format.

DETAILED DESCRIPTION

The present invention relates generally to data object types in a processing system and more particularly to managing object types for data objects defined externally to the system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is implemented in a computer or a computer network. In the preferred embodiment the present invention is implemented in a computer network, wherein client programs, also known as application programs, are not server-resident. Client programs are preferably external to the server so that they can operate on small size systems (e.g., personal computers, workstations, etc.). One of ordinary skill in the art will recognize that any client-server configuration may be used to implement the present invention, including a configuration wherein the client programs are resident in any computer including the server.

Figure 1:
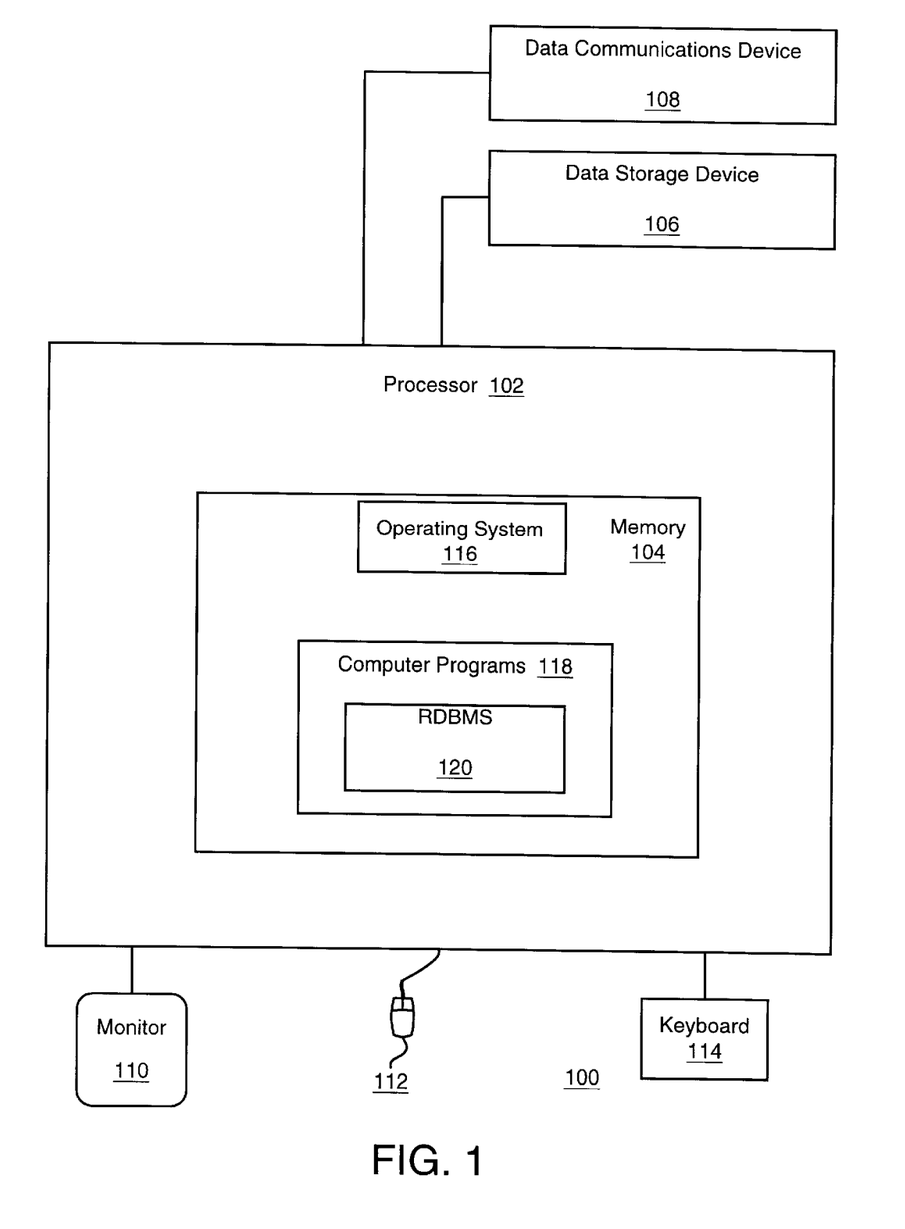
FIG. 1 illustrates a hardware environment used to implement the present invention.

Accordingly, FIG. 1 illustrates a hardware environment used to implement the present invention. As illustrated in FIG. 1, in the preferred embodiment the present invention is implemented in a server computer ("server") 100. The server 100 generally includes, a processor 102, a memory 104 such as a random access memory (RAM), a data storage device 106 (e.g., hard drive, floppy disk drive, CD-ROM disk drive, etc.), a data communication device 108 (e.g., modem, network interface device, etc.), a monitor 110 (e.g., CRT, LCD display, etc.), a pointing device 112 (e.g., a mouse, a track ball, a pad or any other device responsive to touch, etc.) and a keyboard 114. It is envisioned that attached to the computer 100 may be other devices such as read only memory (ROM), a video card drive, printers, peripheral devices including local and wide area network interface devices, etc. One of ordinary skill in the art will recognize that any combination of the above system components may be used to configure the server 100.

The server 100 operates under the control of an operating system ("OS") 116, such as MVS™, AIX™, UNIX™, OS/2™, WINDOWS™, WINDOWS NT™, etc., which typically, is loaded into the memory 104 during the server 100 start-up (boot-up) sequence after power-on or reset. In operation, the OS 116 controls the execution by the server 100 of computer programs 118, including server and/or client-server programs. Alternatively, a system and method in accordance with the present invention may be implemented with any one or all of the computer programs 118 embedded in the OS 116 itself without departing from the scope of the invention. Preferably, however, the client programs are separate from the server programs and are not resident on the server.

The OS 116 and the computer programs 118 each comprise computer readable instructions which, in general, are tangibly embodied in or are readable from a media such as is the memory 104, the data storage device 106 and/or the data communications device 108. When executed by the server 100, the instructions cause the server 100 to perform the steps necessary to implement the present invention. Thus, the present invention may be implemented as a method, apparatus, or an article of manufacture (a computer-readable media or device) using programming and/or engineering techniques to produce software, hardware, firmware, or any combination thereof.

The server 100 is typically used as a part of an information search and retrieval system capable of receiving, retrieving and/or dissemination information over the Internet, or any other network environment. One of ordinary skill in the art will recognize that this system may include more than one of server 100.

In the information search and retrieval system, such as a digital library system, a client program communicates with the server 100 by, inter alia, issuing to the server search requests and queries. The server 100 then responds by providing the requested information. The digital library system is typically implemented using a relational database management system software (RDBMS) 120 such as the DB2⁷ by IBM Corporation. The RDBMS 120 receives and responds to search and retrieval requests and termed queries from the client. In the preferred embodiment, the RDBMS 120 is server-resident.

In the digital library system, such as IBM Content Manager by IBM Corporation, a library server (such as server 100) performs a library server program ("server program") and an object server (such as server 100) performs an object server program (also "server program"). This dual-server digital library system is typically used as a large-scale information objects search and retrieval system which operates in conjunction with the RDBMS 120. Large-scale information objects ("objects") include a high resolution digital representation of ancient works of authorship and ancient works of art such as those found in the Vatican, as well as movies, classic and modem art collections, books, etc.

The objects themselves are typically stored in a relational database connected to the object server, and the information about the objects is stored in a relational database connected to the library server, wherein the server program(s) operate in conjunction with the RDBMS 120 to first store the objects and then to retrieve the objects. One of ordinary skill in the art will recognize that the foregoing is an exemplary configuration of a system which embodies the present invention, and that other system configurations may be used without departing from the scope and spirit of the present invention. method for managing object types for objects which are defined externally to the system is disclosed. A relational database and operations on that schema are implemented to record of a relationship of an object to an object class within the system and also record a system-defined super-class of a user-defined subclass.

A plurality of tables are utilized to record the Tag relationship and the system defined super-class. The tables hold the following data:

system-defined base object-classes (list of base-types)

user-defined object-classes (list of derived-types)

object references (list of object references)

links references (list of relationships between object references)

A system and method in accordance with the present invention allows for managing object types for objects that are received and returned by a system, but are defined externally to the system.

An advantage of a method and system in accordance with the present invention is the lightweight nature of the solution. A system and method in accordance with the present invention allows for the creation of user-defined object-classes in a system-defined object-class hierarchy.

An example scenario will be utilized to describe how a method and system in accordance with the present invention solves the problem with more particularity. In this embodiment, the present invention is described in the context of a graph engine system, however, one of ordinary skill in the art readily recognizes that present invention could be implemented in a variety of environments and that use would be within the spirit and scope of the present invention. This scenario will start from an application point of view and then move the system point of view.

Application

Figure 2:
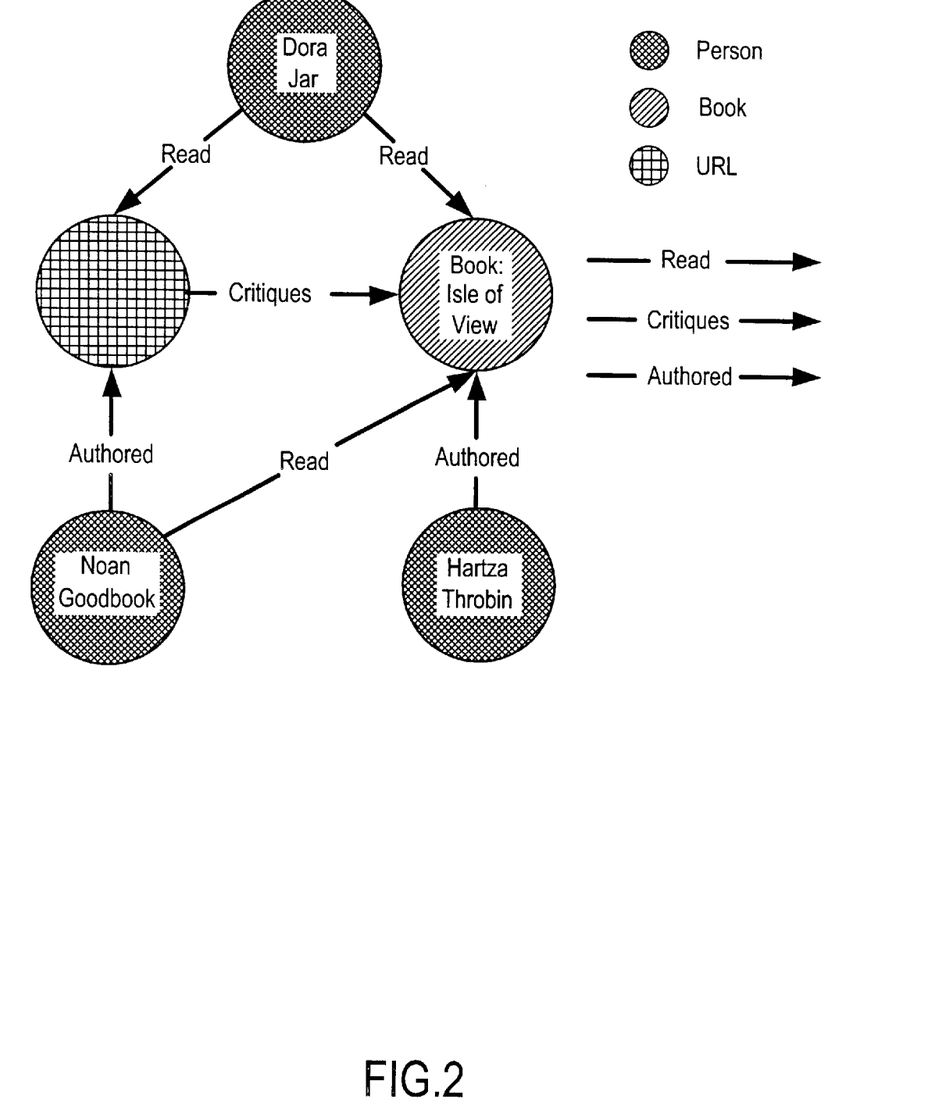
FIG. 2 illustrates a graph of the scenario information.

Noah Goodbook has critiqued "Isle of View", by Hartza Throbin. The review is located at http://www.xyz.com. Dora Jar has read both writings. An application views this scenario in this manner. FIG. 2 illustrates a graph of the scenario information.

Figure 3:
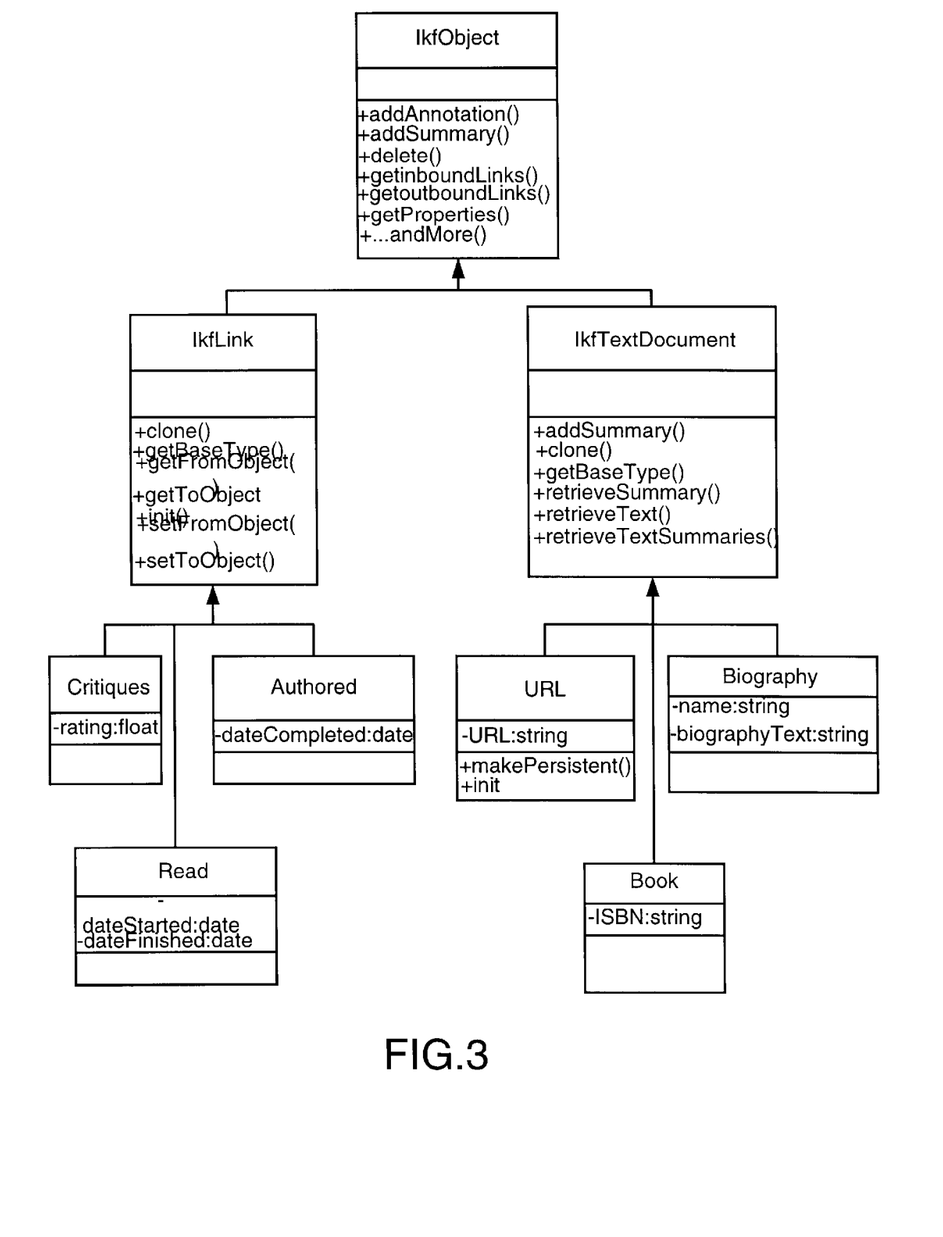
FIG. 3 illustrates the object-class hierarchy for FIG. 2.

The object-class hierarchy needs to be defined. There is an existing object-class hierarchy previously defined by the system. It comprises IkfObject, IkfLink, and IkfTextDocument. The elements of FIG. 2 are link objects for critiques, read, authored, and document objects for URL, Book, and Biography. These link objects are generated externally to the system. An example of the object-class hierarchy for this scenario is shown in FIG. 3.

To implement the object-class hierarchy in Java, the application would provide a hierarchy for the non-IKF classes. Examples of this hierarchy are shown hereinbelow.

public class Critiques extends IkfLink { . . . }
    public class Read extends IkfLink { . . . }
    public class Authored extends IkfLink { . . . }
    public class URL extends IkfTextObject { . . . }
    public class Book extends IkfTextObject { . . . }
    public class Biography extends IkfTextObject { . . . }

To allow for this scenario to be passed from an application to the system, the system needs to be aware of what user object classes have been created externally to the system. The application and the system now interact with each other. The application will hand the system an object, such as a URL object, to store in the graph. The application will also ask the system to store links between objects.

Later, the application will request the links and the objects. The application will expect the system to return the links and objects with the same object-class as they were stored. In other words, the system should not receive a "URL" object and return it as a "Book" object. If it was received as a URL object, it should be returned as a URL object. Accordingly, the present invention allows for the management of objects that are generated externally by, for example, an application program.

Next, the scenario will be described from the system point of view.

System

A method and system in accordance with the present invention provides a mechanism for recording a relationship of an object to an object class within the system. It also provides a mechanism for recording a system-defined super-class of a user-defined subclass. To more particularly describe the features of the present invention, refer now to the following discussion in conjunction with the figures.

Figure 4:
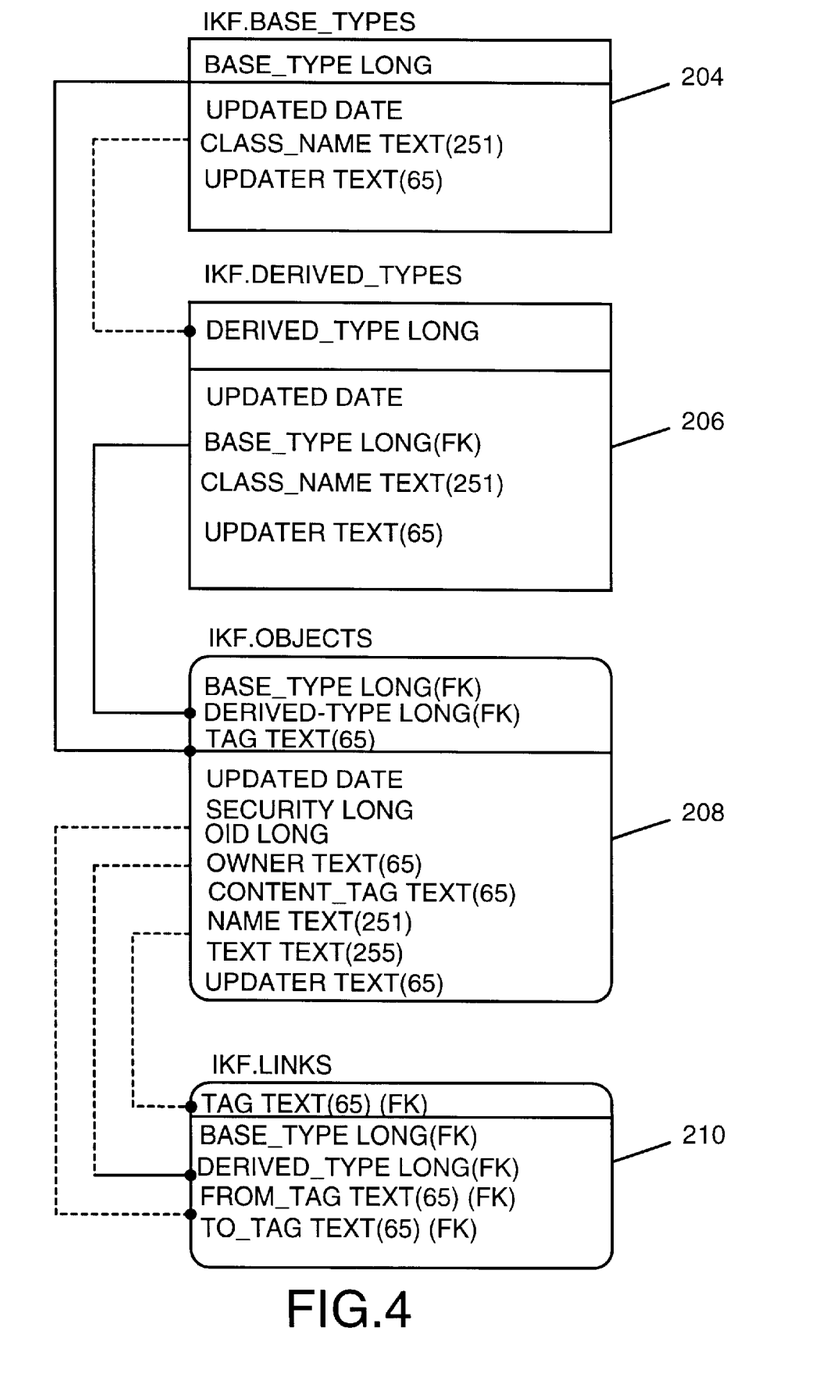
FIG. 4 illustrates a relational database schema in accordance with the present invention.

In a preferred embodiment, a method and system in accordance with the present invention comprises a relational database schema and a plurality of operations on that schema. FIG. 4 illustrates a relational database schema in accordance with the present invention. Although the present invention is described in the context of a specific type of format (i.e., the IKF format) one of ordinary skill in the art readily recognizes many different types of formats would be utilized and their use would be within the spirit and scope of the present invention.

In this embodiment, the IKF.BASE_TYPES table 204 holds system-defined object-classes. The IKF.DERIVED_TYPES table 206 holds user-defined object-classes. Each object in the IKF.OBJECTS table 208 has a field for the base-type and derived-type of the object. The IKF.LINKS table 210 is an example of a system-defined object-class (e.g., IkfLink).

Each of these tables is described in detail hereinbelow.

The IKF.BASE TYPES table 204

Figure 5:
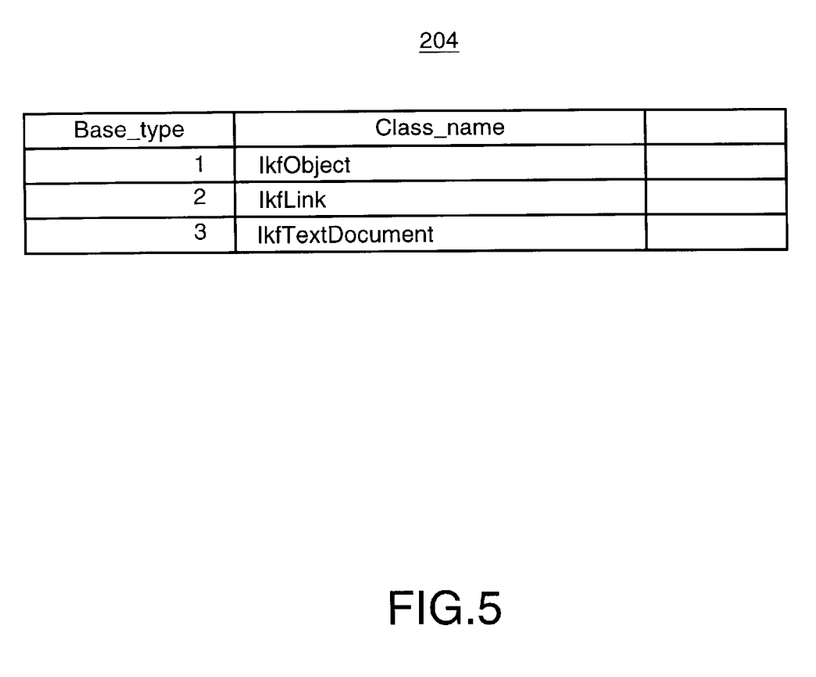
FIG. 5 illustrates the IKF.BASE_TYPES table.

FIG. 5 illustrates the TKF.BASE_TYPES table 204. This table holds a list of base types. The Base_type column is the primary key. It holds a unique number that identifies the class known commonly by the text string Class_name.

The IKF.DERIVED TYPES table 206

Figure 6:
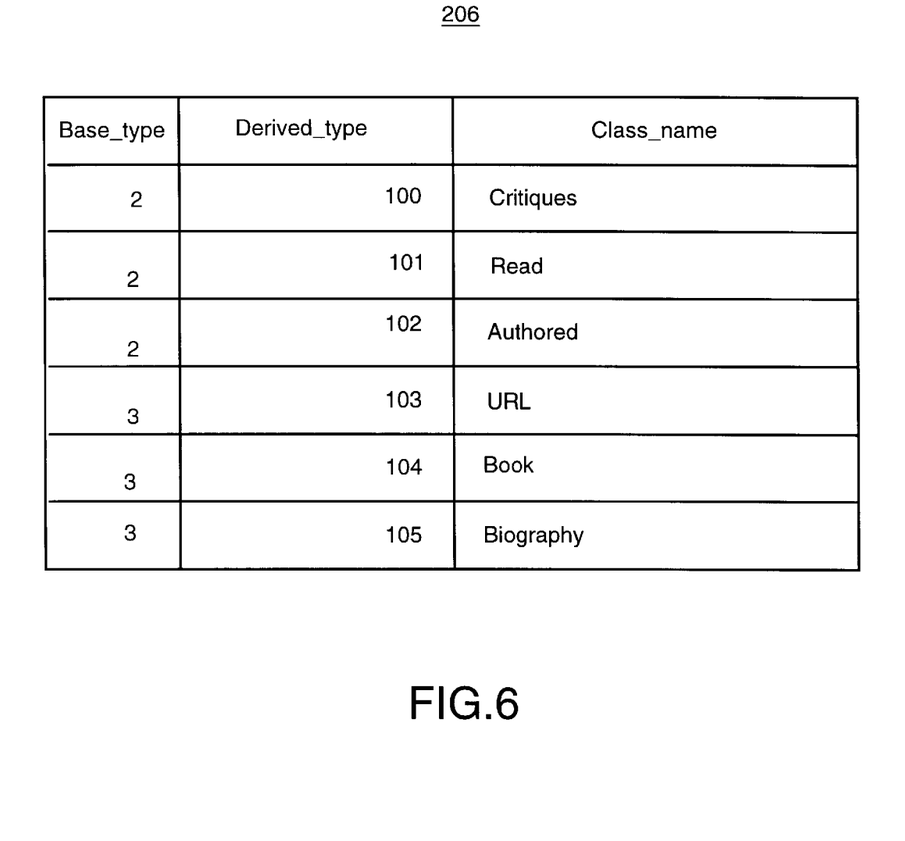
FIG. 6 illustrates the IKF.DERIVED_TYPES table.

FIG. 6 illustrates the IKF.DERIVED_TYPES table 206. This table holds a list of derived types. The Derived_type column is the primary key. It holds a unique number that identifies the class known commonly by the text string Class_name. Each class inherits from a super-class identified by the Base_type column that references the IKF.BASE_TYPES table.

The IKF.OBJECTS table 208

Figure 7:
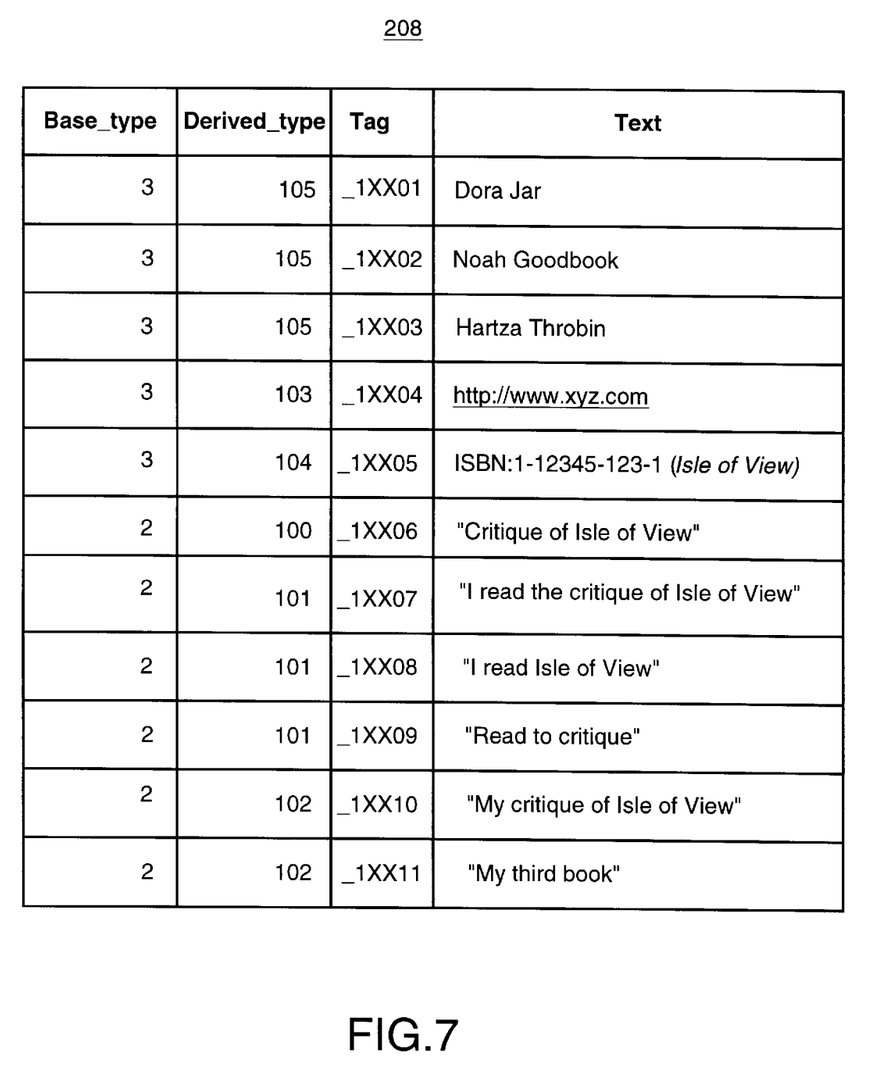
FIG. 7 illustrates the IKF.OBJECTS type table.

FIG. 7 illustrates the IKF.OBJECTS type table 208. This table holds a list of object references. Each object reference has a text description which allows for location of the object to be understood; this is the Text column. The Tag column provides unique identification for each object reference. The object that is referenced belongs to an object-class. The Base_type and Derived_type columns specify that object-class. Each class inherits from a super-class identified by the Base_type column that references the IKF.BASE_TYPES table.

IKF.LINKS table 210.

Figure 8:
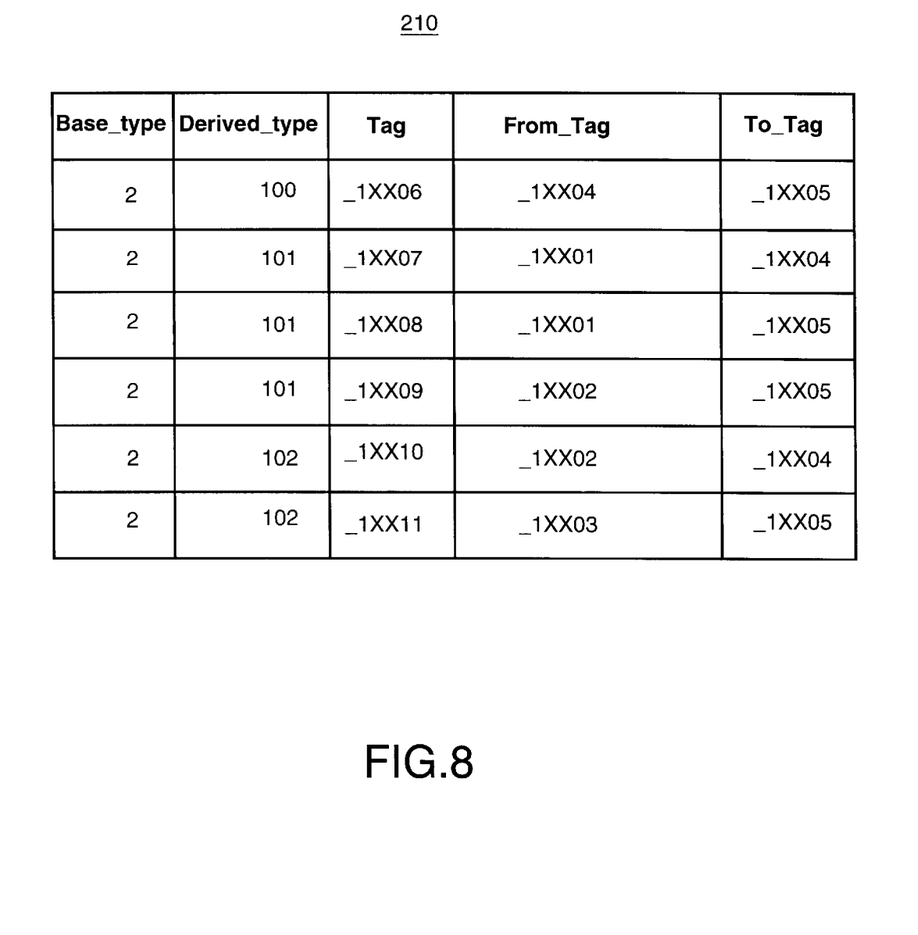
FIG. 8 illustrates the IKF.LINKS types table.

FIG. 8 illustrates the IKF.LINKS types table 210. This table holds a list of relationships between object references. The Tag column uniquely identifies each relationship. Each relationship has a beginning of the relationship, known by the From_Tag that references the IKF.OBJECTS.Tag column. Each relationship also has an end of the relationship, known by the To_Tag that also references the IKF.OBJECTS.Tag column. Each relationship may also belong to an object-class. The Base_type and Derived_type columns specify that object-class. These columns reference IKF.BASE_TYPES.Base_type and IKF.DERIVED_TYPES.Derived_type, respectively.

Figure 9:
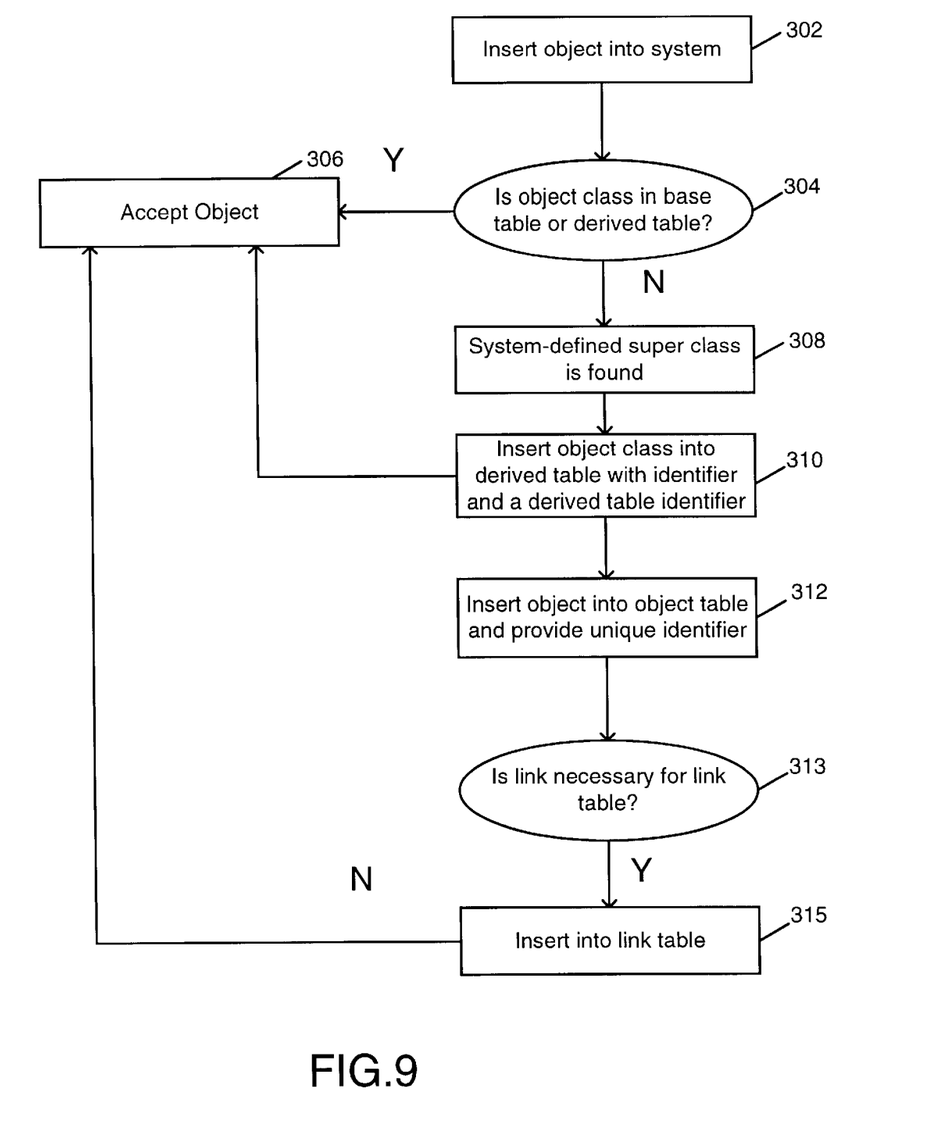
FIG. 9 is a flow chart which illustrates how a system receives externally generated objects.

With all of this data in place, the system can now receive and return externally generated objects. FIG. 9 is a flow chart which illustrates how a system receives externally generated objects. First, the application inserts the object into the system, via step 302. Next, the system checks to see if the object-class is represented in either a base table or a derived table (IKF.DERIVED_TYPES or IKF.BASE_TYPES tables), via step 304. If the object-class is represented, the object is accepted, via step 306. On the other hand, if the object-class is not represented, then a system-defined super-class of the object is found, via step 308 and the object-class is inserted into the derived table with the identifier of the system-defined super-class and a derived type identifier to create an accepted object, via steps 310 and 306. The accepted object is inserted into an object table (IKF.OBJECTS table) and given a unique identifier known as a "Tag", via step 312. In addition, if the object is a subclass of IkfLink, it is also inserted into a link table (IKF.LINKS table), via steps 313 and 315. Thereafter, the instances of this object class are accepted, via step 306.

Figure 10:
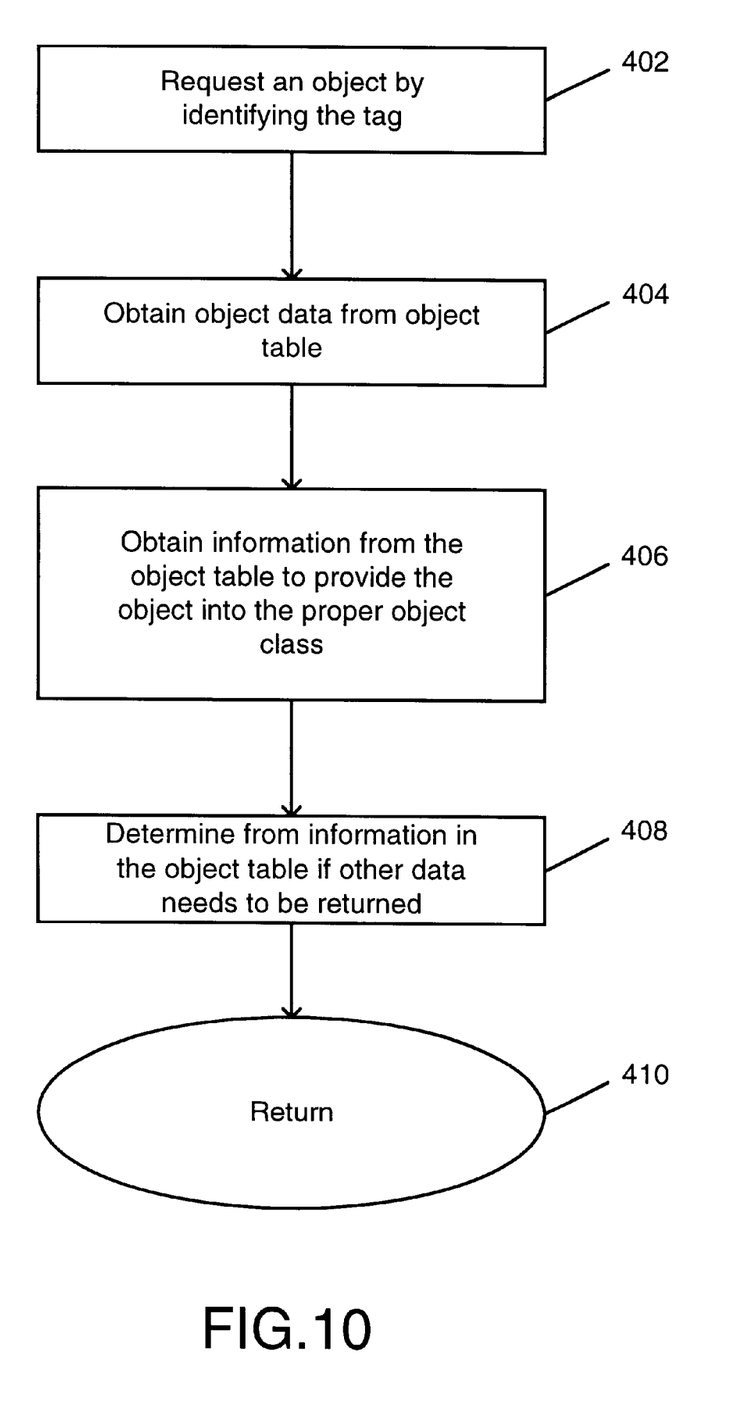
FIG. 10 is a flow chart which illustrates how the system returns an externally generated object.

FIG. 10 is a flow chart which illustrates how the system returns an externally generated object. First, the application requests an object from the system by identifying its unique identifier, the "Tag", via step 402. Then the system obtains the object data in an object table, via step 404. The system obtains the information in the objects table (IKF.OBJECTS.Derived_type) to determine how to create the object as an instance of the correct object-class, via step 406. The system uses the information in the objects table (IKF.OBJECTS.Base_type) to determine if other data needs to be returned, via step 408. For example, a base type of "2" means that additional information resides in the IKF.LINKS table. The object is then returned to its object-class, via step 410.

Accordingly, a method and system for managing object types for objects which are defined externally to the system is disclosed. The method and system allows for the objects to be efficiently and correctly categorized within a system. The system therefore can send and receive externally generated objects in an efficient and accurate manner. A plurality of tables are utilized to record a unique identifier and the system defined super-class.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for receiving an externally generated information object by a system comprising of:

(a) determining that an object class for the externally generated information object is not represented in a base table or a derived table by the system;

(b) obtaining a system-defined super-class for the information object;

(c) inserting the object class of the information object into the derived table with an identifier of the system defined super-class and an object class identifier to create a relationship between the system-defined super-class and the object class of the information object; and (d) inserting the information object and its unique identifier into an object table to create an accepted information abject.

2. The method of claim 1 which includes the step of (e) inserting the accepted information object and its unique identifier into a links table.

3. The method of claim 2 wherein the unique identifier comprises a tag.

4. A system for receiving an externally generated information object by a system comprising the steps of:

means for determining that an object class for the externally generated information object is not represented in a base table or a derived table in the system;

means for obtaining a system-defined super-class for the information object;

means for inserting an object class of the information object into the derived table with an identifier of the system defined super-class and an object class identifier to create a relationship between the system-defined super-class and the object class of the information object; and means for inserting the information object and its unique identifier into an objects table to create an accepted information object.

5. The system of claim 4 wherein the unique identifier comprises a tag.

6. A computer readable medium containing program instructions for receiving an externally generated information object by a system comprising:

(a) determining that an object class for the externally generated information object is not represented in a base table or a derived table in the system;

(b) obtaining a system-defined super-class for the information object;

(c) inserting an object class of the information object into the derived table with an identifier of the system defined super-class and an object class identifier to create a relationship between the system-defined super-class and the object class of the information object; and (d) inserting the information object and its unique identifier into an objects table to create an accepted information object.

* * * * *

UNITED STATES PATENT AND TRADEMARK OFFICE
CERTIFICATE OF CORRECTION

PATENT NO. : 6,591,276 B1  
DATED : July 8, 2003  
INVENTOR(S) : Michael J. Dockter and Randal J. Richardt

It is certified that error appears in the above-identified patent and that said Letters Patent is hereby corrected as shown below:

<u>Column 3,</u>
Line 26, delete "is".

<u>Column 7,</u>
Line 20, delete "object" and replace with -- objects --.
Line 21, delete "abject" and replace with -- object --.

Signed and Sealed this

Eleventh Day of May, 2004

JON W. DUDAS
*Acting Director of the United States Patent and Trademark Office*